United States Patent
Tham et al.

(10) Patent No.: US 10,519,862 B2
(45) Date of Patent: Dec. 31, 2019

(54) GAS TURBINE ENGINE WITH ROTOR CENTERING COOLING SYSTEM IN AN EXHAUST DIFFUSER

(71) Applicant: Siemens Energy, Inc., Orlando, FL (US)

(72) Inventors: Kok-Mun Tham, Oviedo, FL (US); Abdullatif M. Chehab, Chuluota, FL (US); Ross Peterson, Palm Beach Gardens, FL (US)

(73) Assignee: Siemens Energy, Inc., Orlando, FL (US)

( * ) Notice: Subject to any disclaimer, the term of this patent is extended or adjusted under 35 U.S.C. 154(b) by 468 days.

(21) Appl. No.: 15/316,716

(22) PCT Filed: Jun. 10, 2014

(86) PCT No.: PCT/US2014/041649
§ 371 (c)(1),
(2) Date: Dec. 6, 2016

(87) PCT Pub. No.: WO2015/191039
PCT Pub. Date: Dec. 17, 2015

(65) Prior Publication Data
US 2017/0138264 A1 May 18, 2017

(51) Int. Cl.
*F02C 7/18* (2006.01)
*F01D 9/06* (2006.01)
(Continued)

(52) U.S. Cl.
CPC ............... *F02C 7/18* (2013.01); *F01D 9/04* (2013.01); *F01D 9/065* (2013.01); *F01D 25/125* (2013.01);
(Continued)

(58) Field of Classification Search
CPC .... F02C 7/16; F02C 7/18; F01D 9/065; F01D 9/04; F01D 25/14; F01D 25/28
See application file for complete search history.

(56) References Cited

U.S. PATENT DOCUMENTS

| | | | |
|---|---|---|---|
| 8,500,392 B2 * | 8/2013 | Durocher | F01D 9/06 415/116 |
| 2003/0150205 A1 * | 8/2003 | Baxter | F01D 25/145 60/39.5 |

(Continued)

FOREIGN PATENT DOCUMENTS

| | | |
|---|---|---|
| CN | 101743391 A | 6/2010 |
| CN | 102678334 A | 9/2012 |

(Continued)

OTHER PUBLICATIONS

Translation JP56-129725 to Suda Tadao (Year: 1981).*
(Continued)

*Primary Examiner* — Carlos A Rivera

(57) ABSTRACT

A gas turbine engine having a rotor centering cooling system for cooling struts within an exhaust diffuser and turbine case to reduce tip rub during hot restarts is disclosed. In particular, the rotor centering cooling system may be positioned within struts in the exhaust diffuser downstream from a turbine assembly for limiting thermal gradients between top and bottom struts to prevent the exhaust bearing body from becoming off-center during steady state operation as a result of the top struts becoming hotter than the bottom struts. The rotor centering cooling system may reduce the temperature at the exhaust diffuser and turbine case, thereby reducing the thermal gradient between the top and bottom struts and top and bottom of the turbine case. As such, the exhaust bearing body remains centered, thereby preventing a tighter blade tip clearance at the top of the turbine assembly than at the bottom of the assembly.

9 Claims, 6 Drawing Sheets

(51) Int. Cl.
*F01D 25/12* (2006.01)
*F01D 25/14* (2006.01)
*F01D 25/28* (2006.01)
*F01D 25/30* (2006.01)
*F01D 9/04* (2006.01)

(52) U.S. Cl.
CPC ............. *F01D 25/14* (2013.01); *F01D 25/28* (2013.01); *F01D 25/30* (2013.01); *F05D 2220/32* (2013.01); *F05D 2260/205* (2013.01)

(56) References Cited

U.S. PATENT DOCUMENTS

| | | | | |
|---|---|---|---|---|
| 2011/0138819 | A1* | 6/2011 | Tanimura | F01D 25/30 60/796 |
| 2013/0084172 | A1* | 4/2013 | Kasibhotla | F01D 25/125 415/182.1 |
| 2014/0119880 | A1* | 5/2014 | Rodriguez | F01D 9/065 415/1 |
| 2014/0205447 | A1* | 7/2014 | Patat | F01D 9/065 415/177 |
| 2016/0245114 | A1* | 8/2016 | Wang | F01D 25/162 |

FOREIGN PATENT DOCUMENTS

| | | |
|---|---|---|
| EP | 2336524 A2 | 6/2011 |
| JP | S56129725 A | 10/1981 |
| JP | S59173527 U | 1/1984 |
| JP | 2009052552 A | 3/2009 |
| JP | 2011038475 A | 2/2011 |

OTHER PUBLICATIONS

PCT International Search Report and Written Opinion dated Mar. 10, 2015 corresponding to PCT Application No. PCT/US2014/041649 filed Jun. 10, 2014.

* cited by examiner

GAS TURBINE ENGINE WITH ROTOR CENTERING COOLING SYSTEM IN AN EXHAUST DIFFUSER

FIELD OF THE INVENTION

The present invention relates to gas turbine engines and, more particularly, to structures for providing thermal management to promote thermally-uniform conditions at the exhaust section and providing protection to limit heating of the outer case of a gas turbine engine.

BACKGROUND OF THE INVENTION

A gas turbine engine generally includes a compressor section, a combustor section, a turbine section and an exhaust section. In operation, the compressor section may induct ambient air and compress it. The compressed air from the compressor section enters one or more combustors in the combustor section. The compressed air is mixed with the fuel in the combustors, and the air-fuel mixture can be burned in the combustors to form a hot working gas. The hot working gas is routed to the turbine section where it is expanded through alternating rows of stationary airfoils and rotating airfoils and used to generate power that can drive a rotor. The expanded gas exiting the turbine section may then be exhausted from the engine via the exhaust section.

In a typical gas turbine engine, bleed air comprising a portion of the compressed air obtained from one or more stages of the compressor may be used as cooling air for cooling components of the turbine section. Additional bleed air or an alternative cooling air source may also be supplied to portions of the exhaust section, such as to cool portions of the exhaust section and maintain a turbine exhaust case below a predetermined temperature through a forced convection air flow provided within an outer casing or other components of the engine. Currently, the cooling air supplied to the support struts and adjacent components of the turbine exhaust case is not sufficient. In particular, the strut at top dead center and adjacent struts are heated more than the strut a bottom dead center and the adjacent struts. As such, the steady state position of the exhaust bearing body radially inward of the struts moves off-center in the bottom dead center direction. The higher turbine case temperature at top dead center pulls the top strut, hence the exhaust bearing body, vertically upwards. This is offset partially by the top strut being hotter than the bottom strut. However, the combination of both conditions creates a net result of the exhaust bearing body staying at a vertically higher, off-center position during steady state turbine engine operation with turbine stage one clearance being too tight at top dead center and turbine stage one clearance being too open at bottom dead center. The off-center rotor position can cause an off-center position after shutdown and during turning gear operation, which cause tip rub of the row one turbine blades during a hot restart. Thus, a system that eliminates movement of the exhaust bearing body in a radial direction and into an off-center position is desired.

SUMMARY OF THE INVENTION

A gas turbine engine having a rotor centering cooling system for cooling struts within an exhaust diffuser and turbine case to reduce tip rub during hot restarts is disclosed. In particular, the rotor centering cooling system may be positioned, in part, within struts in the exhaust diffuser downstream from a turbine assembly for limiting thermal gradients of a turbine case and between top and bottom struts to prevent the exhaust bearing body from becoming off-center during steady state operation as a result of the top struts and casing becoming hotter than the bottom struts. The rotor centering cooling system may reduce the temperature at the exhaust diffuser such that the thermal gradient between the top and bottom struts is reduced as compared to conventional systems. As such, the exhaust bearing body remains centered, thereby preventing a tighter turbine blade tip clearance at the top of the turbine assembly than at the bottom of the turbine assembly. The cooling system may be used during steady state operation and during shutdown, with cooling air being supplied by an external fan to control temperature gradients.

In at least one embodiment, a gas turbine engine may include one or more exhaust diffusers positioned downstream from a turbine assembly, extending circumferentially around a central longitudinal axis of the gas turbine engine and having an increasing cross-sectional area from an upstream edge to a downstream edge. One or more struts may extend from the at least one exhaust diffuser radially inward to an inner exhaust diffuser housing forming a radially inner surface of the exhaust diffuser. The strut may include one or more internal cooling systems positioned within an outer wall forming the strut. The gas turbine engine may include a rotor centering cooling system formed from an exhaust cooling manifold in communication with the internal cooling system positioned within the outer wall forming the strut for supplying cooling fluid to the internal cooling system in the strut. The rotor centering cooling system may include a rotor centering cooling channel extending from an inlet in the exhaust cooling manifold, through a turbine casing exhaust flange to an outlet in a shroud cavity upstream from the at least one strut and radially outward from an outer wall forming the exhaust diffuser. The cooling fluid flowing through the rotor centering cooling channel entrains ambient air within the shroud cavity, thereby purging the shroud cavity and cooling the turbine casing exhaust flange. The exhaust cooling manifold may be positioned radially outward from the at least one strut.

The rotor centering cooling system may also include one or more exhaust cooling plenums forming a circumferentially extending cooling channel radially outward from the outer wall forming the exhaust diffuser. The exhaust cooling manifold may be in fluid communication with the exhaust cooling manifold via one or more metering holes. The metering hole may be positioned within the turbine casing exhaust flange, thereby providing cooling to the turbine casing exhaust flange. The metering hole may have a radially extending width equal to a radially extending width of the exhaust cooling plenum at the turbine casing exhaust flange. The exhaust cooling plenum may be positioned upstream from the exhaust cooling manifold.

The rotor centering cooling channel may extend upstream from the exhaust cooling manifold to the shroud cavity. In at least one embodiment, the rotor centering cooling channel may extend from the exhaust cooling manifold to the shroud cavity and between the exhaust cooling manifold and the strut. The outlet of the rotor centering cooling channel may be formed from one or more slots. The outlet of the at least one rotor centering cooling channel has a circular cross-section.

The gas turbine engine may include a plurality of struts. In at least one embodiment, the gas turbine engine may include a top strut with a first side strut offset circumferentially to a first side and a second side strut offset to a second side that is in an opposite circumferential direction from the first side. The top strut, first side strut and second side strut may each have the one or more internal cooling systems and a rotor centering cooling system comprising an exhaust cooling manifold in communication with the internal cooling system positioned within the outer wall forming the strut for supplying cooling fluid to the internal cooling system in the strut. The rotor centering cooling system formed in each of the top strut, first side strut and second side strut include one or more rotor centering cooling channels extending from an inlet in the exhaust cooling manifold, through a turbine casing exhaust flange to an outlet in a shroud cavity upstream from the and radially outward from an outer wall forming the exhaust diffuser, wherein the cooling fluid flowing through the rotor centering cooling channel entrains ambient air within the shroud cavity, thereby purging the shroud cavity and cooling the turbine casing exhaust flange. The top strut, first side strut and second side strut all extend upwardly above a midline plane of the gas turbine engine that extends generally through the central longitudinal axis of the gas turbine engine.

Advantage of the rotor centering cooling system is that the rotor centering cooling system provides a twofold cooling to struts, exhaust flange and associated components to reduce thermal gradients and thermal stress to prevent turbine tip rub during hot restarts by preventing the exhaust bearing body from moving off-center.

Another advantage of the rotor centering cooling system is that the one or more inlets of the rotor centering cooling channel in the exhaust cooling manifold, which increases the flow of cooling fluids through the exhaust cooling manifold which promotes higher cooling fluid flow through the metering holes in the turbine casing exhaust flange, thus addressing selectively the top-to-bottom thermal gradient on the turbine casing exhaust flange area.

Yet another advantage of the rotor centering cooling system is that the rotor centering cooling channel redirects the cooling air to flow through the turbine casing exhaust flange a second time as the cooling air is exhausted from the outlet in the turbine casing exhaust flange and into the shroud cavity where the cooling fluid entrains the ambient air in the shroud cavity to create an air mover or ejector effect. With a relatively small amount of air from the exhaust cooling manifold, the ambient air in the shroud cavity can be energized such that the mass flow of cooling air supplied to cool the flange on the second-pass cooling significantly increases and purges the shroud cavity.

Another advantage of the invention is that the rotor centering cooling system may achieve circumferentially uniform metal temperatures in the turbine casing exhaust flange area.

Still another advantage of the invention is that purging the shroud cavity suppresses any buoyancy-driven flows that may drive any top-to-bottom temperatures in the turbine casing exhaust flange area.

Another advantage of the invention is that pins within the internal cooling system in the struts may be adjusted to increase flow to compensate for the decrease in flow from the exhaust cooling manifold into the internal cooling system caused by the flow of cooling fluids into the rotor centering cooling channel.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
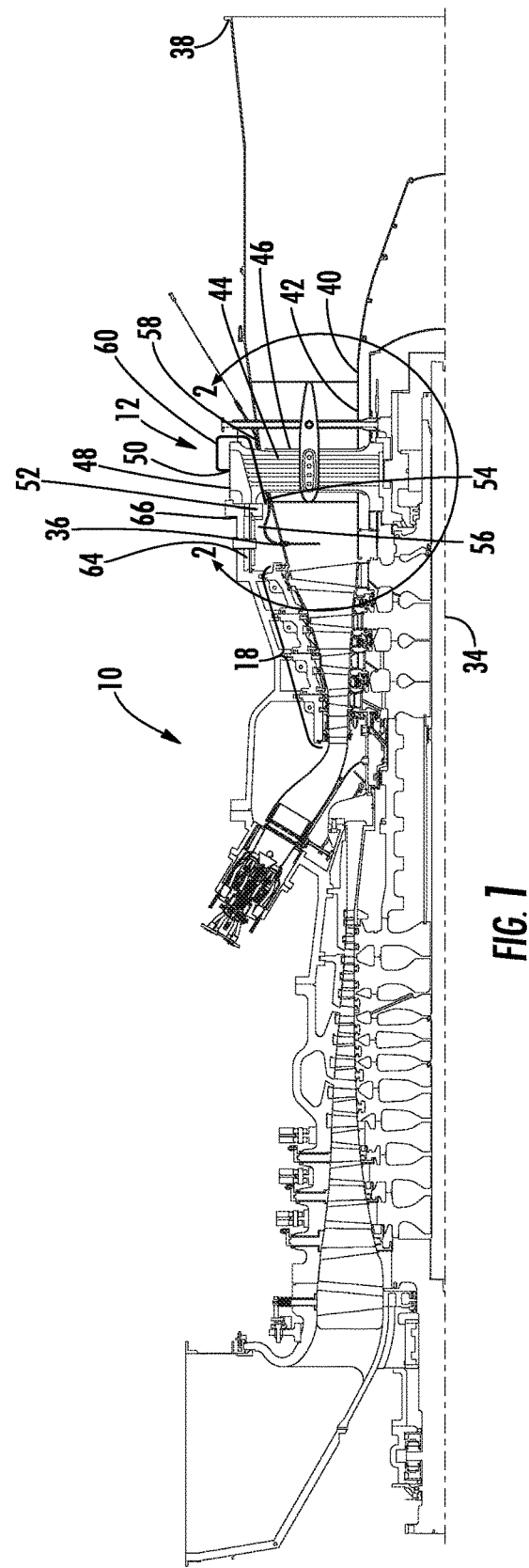
FIG. 1 is a cross-sectional side view of a gas turbine engine including the rotor centering cooling system for cooling struts and turbine casing exhaust flange.
Figure 2:
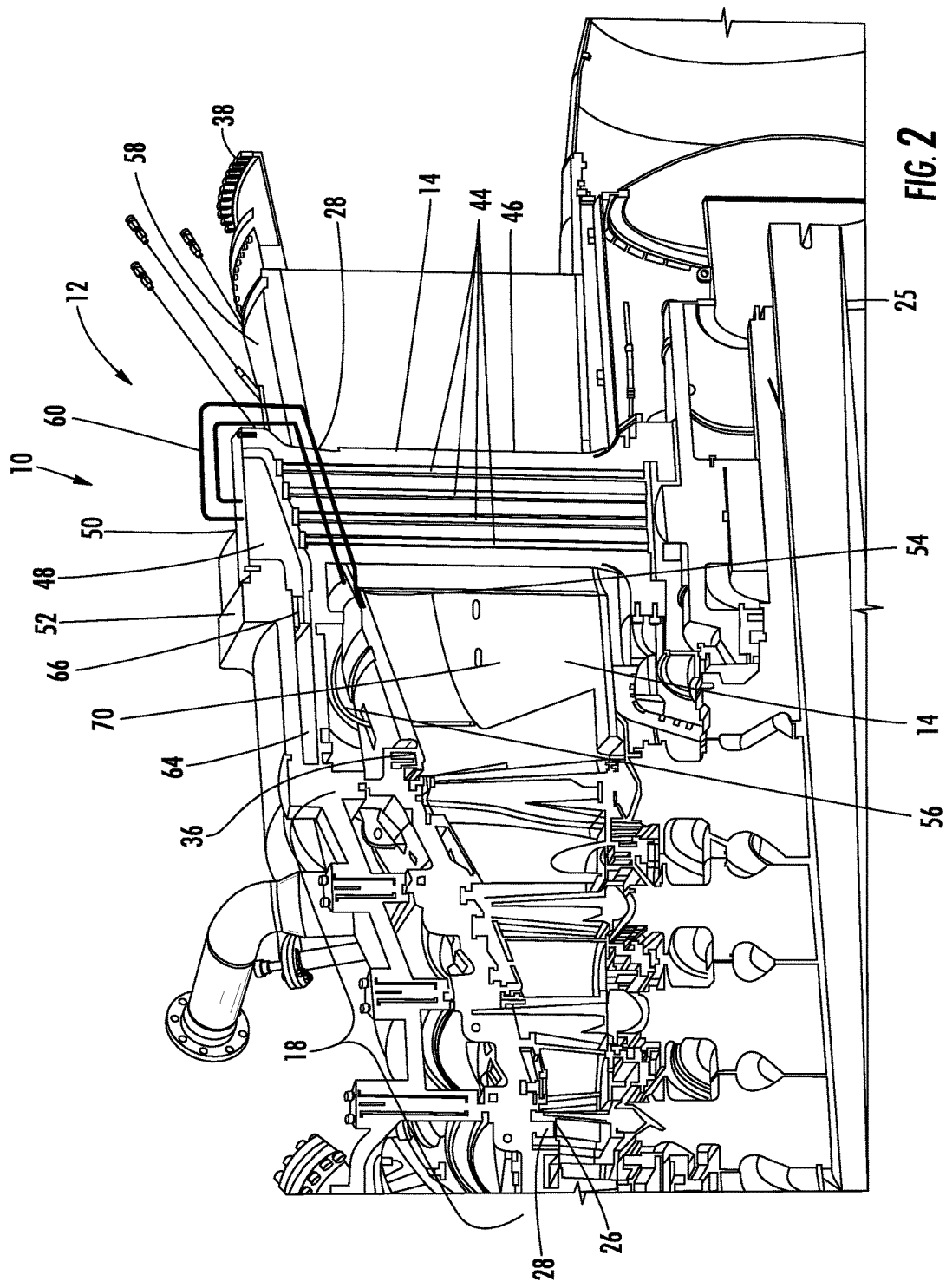
FIG. 2 is a partial cross-sectional, perspective, downstream view of the gas turbine engine including the rotor centering cooling system for cooling struts and turbine casing exhaust flange, taken at detail 2-2 in FIG. 1.
Figure 3:
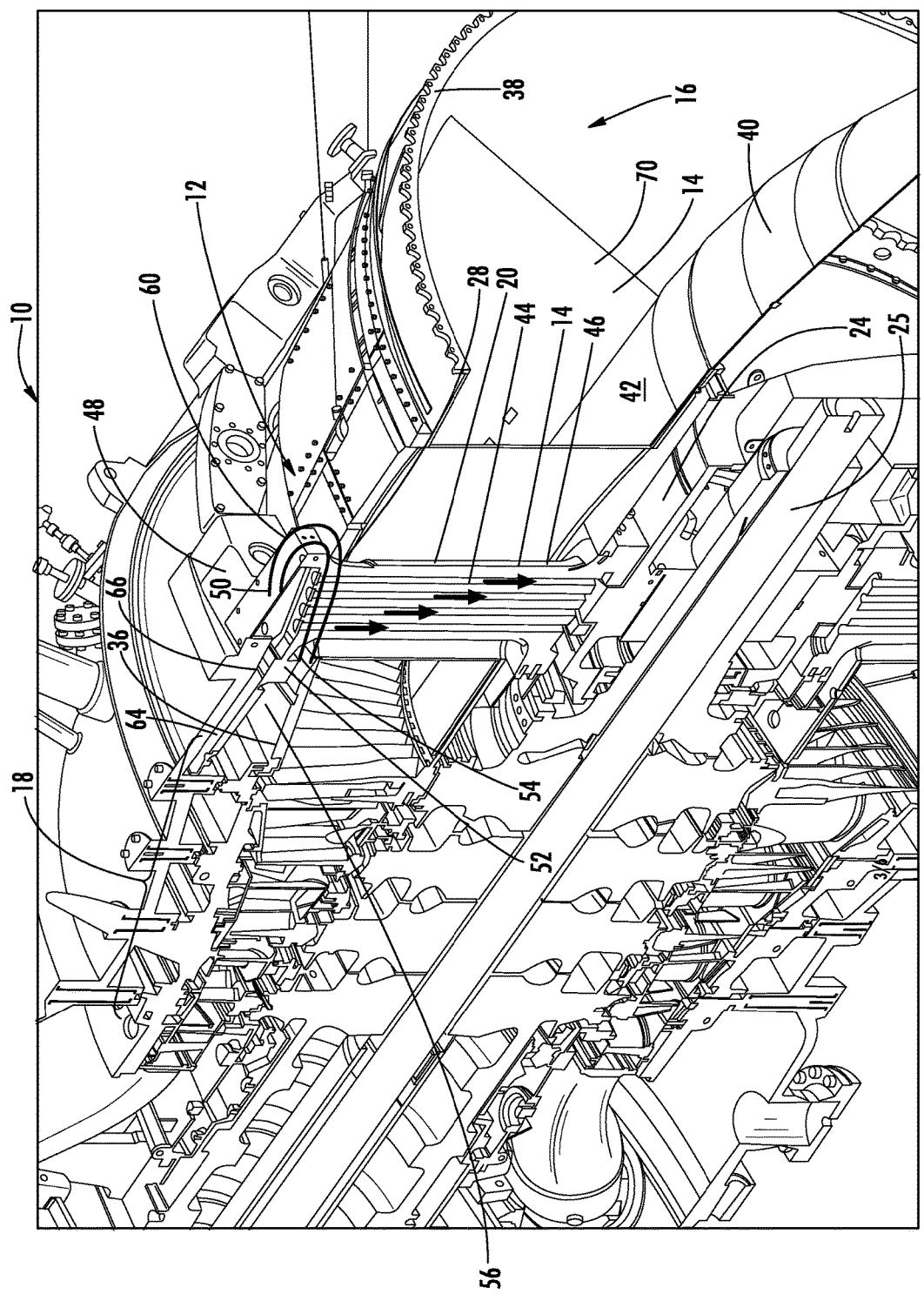
FIG. 3 is a partial cross-sectional, perspective, upstream view of the gas turbine engine including the rotor centering cooling system for cooling struts and turbine casing exhaust flange, taken at detail 2-2 in FIG. 1.
Figure 4:
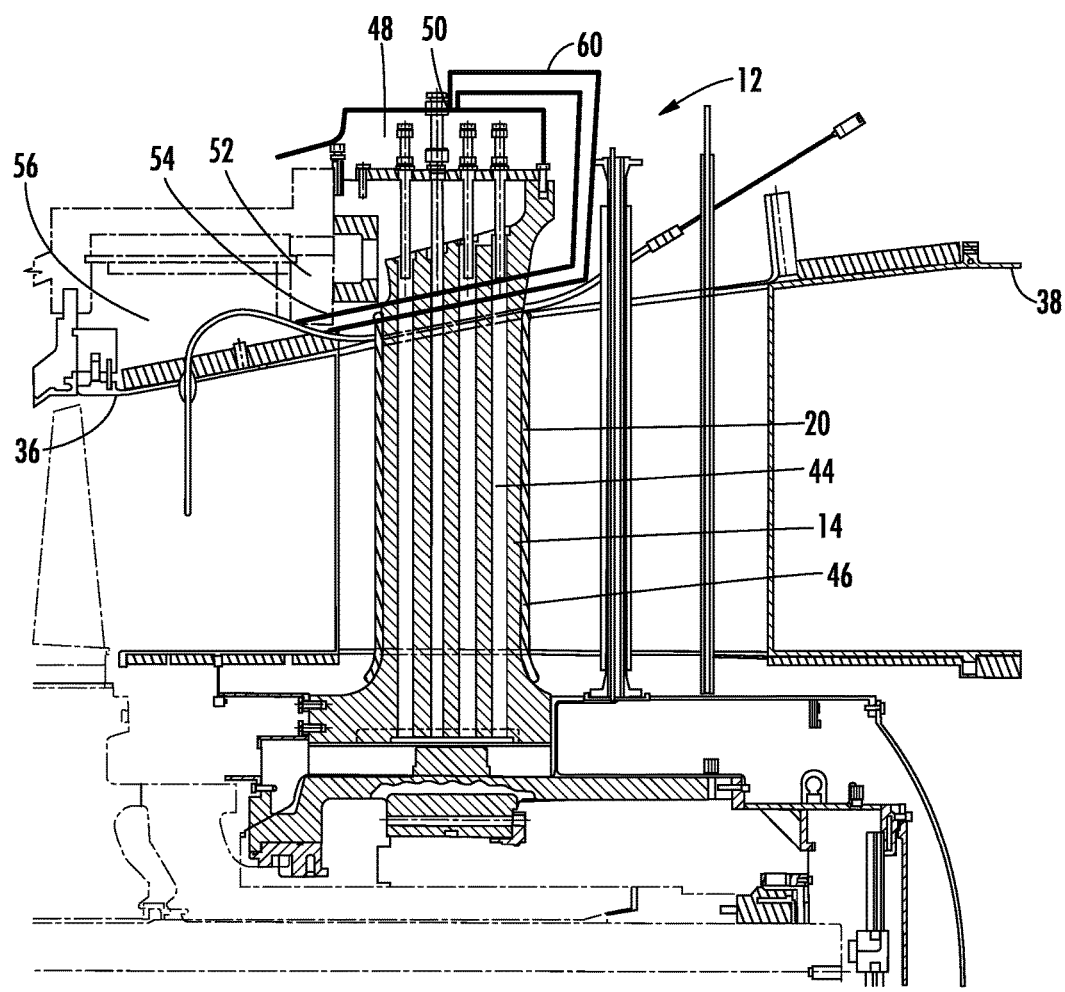
FIG. 4 is a cross-sectional side view of the rotor centering cooling system and the internal cooling system in a cooling strut, taken at detail 2-2 in FIG. 1.
Figure 5:
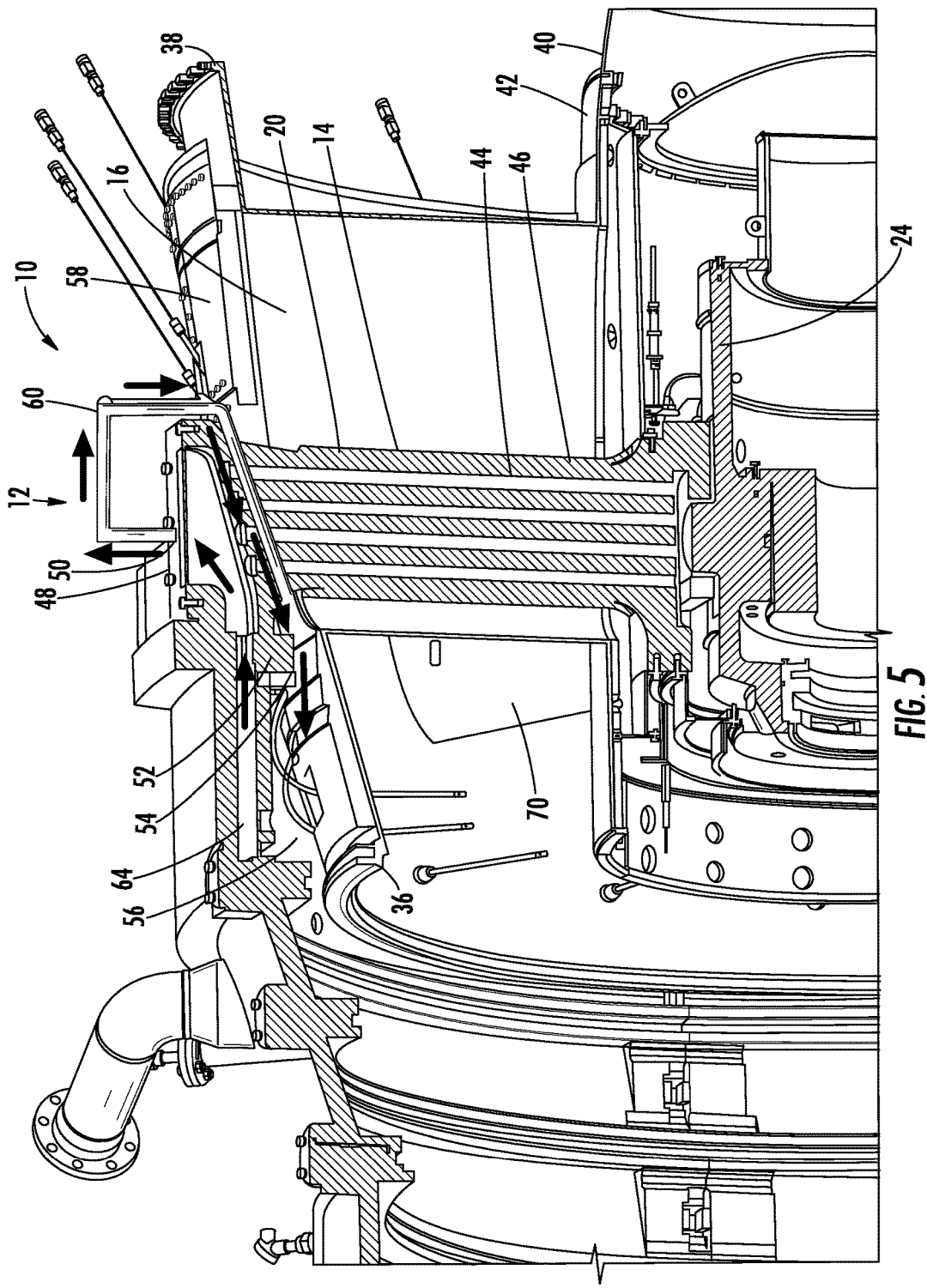
FIG. 5 is a partial cross-sectional, perspective, downstream view of the rotor centering cooling system and the internal cooling system in a cooling strut, taken at detail 2-2 in FIG. 1.

As shown in FIGS. 1-8, a gas turbine engine 10 having a rotor centering cooling system 12 for cooling struts 14 within an exhaust diffuser 16 and turbine case to reduce tip rub during hot restarts is disclosed. In particular, the rotor centering cooling system 12 may be positioned, in part, within struts 14 in the exhaust diffuser 16 downstream from a turbine assembly 18 for limiting thermal gradients between top and bottom struts 20, 22 to prevent the exhaust bearing body 24 supporting the rotor 25 from becoming off-center during steady state operation as a result of the top struts 20 and casing becoming hotter than the bottom struts 22. The rotor centering cooling system 12 may reduce the temperature at the exhaust diffuser 16 such that the thermal gradient between the top and bottom struts 20, 22 is reduced as compared to conventional systems. As such, the exhaust bearing body 24 remains centered, thereby preventing a tighter turbine blade tip clearance 26 at the top 28 of the turbine assembly 18 than at the bottom 32 of the turbine assembly 18. The cooling system 12 may be used during steady state operation and during shutdown, with cooling air being supplied by an external fan to control temperature gradients.

In at least one embodiment, the gas turbine engine 10 may be formed from one or more exhaust diffusers 16, as shown in FIG. 1, positioned downstream from the turbine assembly 18 and extending circumferentially around a central longitudinal axis 34 of the gas turbine engine 10. As shown in FIGS. 1-5, the exhaust diffuser 16 may have an increasing cross-sectional area from an upstream edge 36 to a downstream edge 38, as shown in FIG. 1. The gas turbine engine 10 may include one or more struts 14 extending from the exhaust diffuser 16 radially inward to an inner exhaust diffuser housing 40 forming a radially inner surface 42 of the exhaust diffuser 16. The strut 14 may include one or more internal cooling systems 44 positioned within an outer wall 46 forming the strut 14.

The gas turbine engine 10 may also include one or more rotor centering cooling systems 12 for cooling struts 14 within an exhaust diffuser 16 to reduce tip rub during hot restarts. The rotor centering cooling system 12 may be formed from an exhaust cooling manifold 48 in communication with the internal cooling system 44 positioned within the outer wall 46 forming the strut 14 for supplying cooling fluid to the internal cooling system 44 in the strut 14. The rotor centering cooling system 12 may include one or more rotor centering cooling channels 60 extending from an inlet 50 in the exhaust cooling manifold 48, through a turbine casing exhaust flange 52 to an outlet 54 in a shroud cavity 56 upstream from the strut 14 and radially outward from an outer wall 58 forming the exhaust diffuser 16, such that the cooling fluid flowing through the rotor centering cooling channel 60 entrains ambient air within the shroud cavity 56, thereby purging the shroud cavity 56 and cooling the turbine casing exhaust flange 52.

Figure 8:
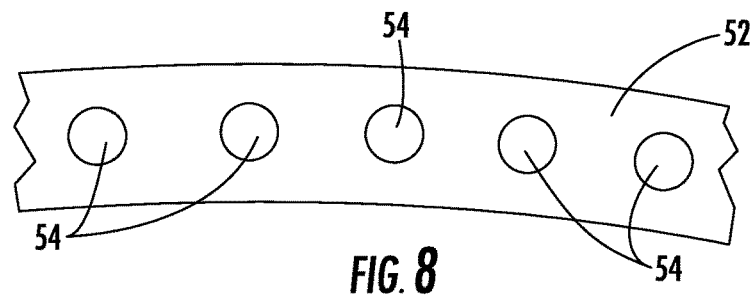
FIG. 8 is a downstream view of another configuration of the outlets of the rotor centering cooling channel extending through the turbine casing exhaust flange.

In at least one embodiment, the exhaust cooling manifold 48 may be positioned radially outward from the strut 14. The rotor centering cooling channel 60 may extend upstream from the exhaust cooling manifold 48 to the shroud cavity 56. The rotor centering cooling channel 60 may extend from the exhaust cooling manifold 48 to the shroud cavity 56 and may be positioned between the exhaust cooling manifold 48 and the strut 14. The outlet 54 of the rotor centering cooling channel 60 may have a circular cross-section other appropriate configuration, as shown in FIG. 8. In at least one embodiment, the outlet 54 may be formed from one or more slots 62. The slot 62 may be a thin slot shape, such as generally elliptical, oval or the like.

The rotor centering cooling system 12 may also include one or more exhaust cooling plenums 64, as shown in FIGS. 1-5, forming a circumferentially extending cooling channel radially outward from the outer wall 58 forming the exhaust diffuser 16. The exhaust cooling plenum 64 may have any appropriate configuration and size. The exhaust cooling plenum 64 may provide cooling fluid to the exhaust cooling manifold 48. The exhaust cooling plenum 64 may be positioned upstream from the exhaust cooling manifold 48. In particular, the exhaust cooling plenum 64 may be in fluid communication with the exhaust cooling manifold 48 via one or more metering holes 66. The metering hole 66 may be positioned within the turbine casing exhaust flange 52, thereby providing cooling to the turbine casing exhaust flange 52. In at least one embodiment, the metering hole 66 may have a radially extending width equal to a radially extending width of the exhaust cooling plenum 64 at the turbine casing exhaust flange 52. As such, a high volume of cooling air may be passed through the turbine casing exhaust flange 52 to increase the cooling capacity of the rotor centering cooling system 12 over conventional systems.

Figure 6:
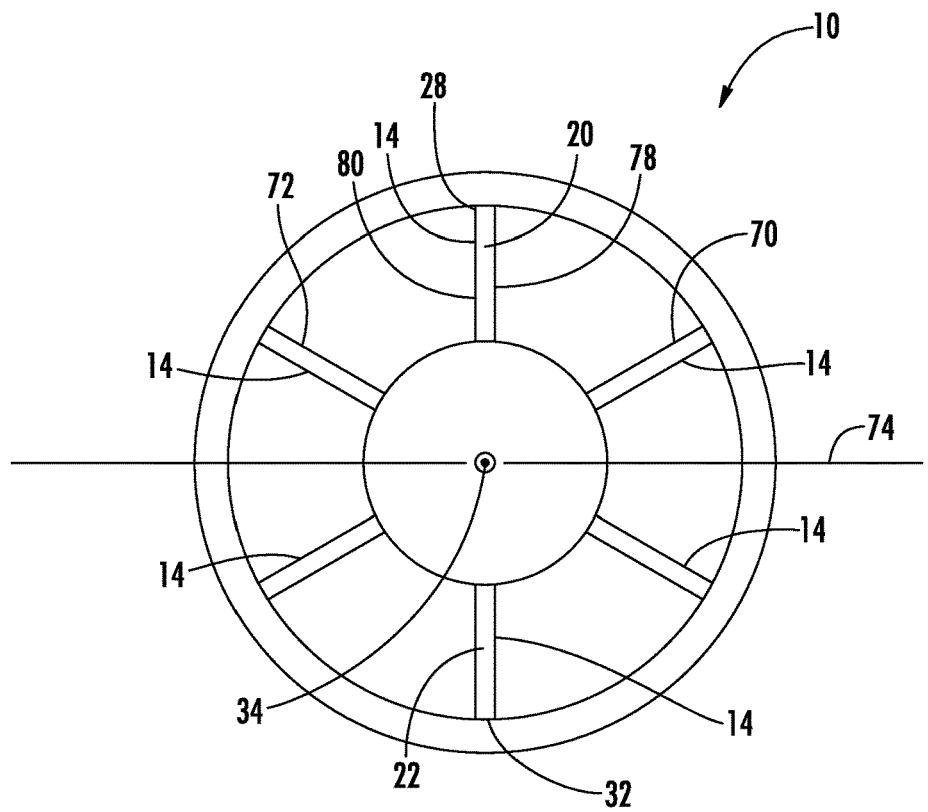
FIG. 6 is a upstream view of the exhaust diffuser with struts in view.
Figure 7:
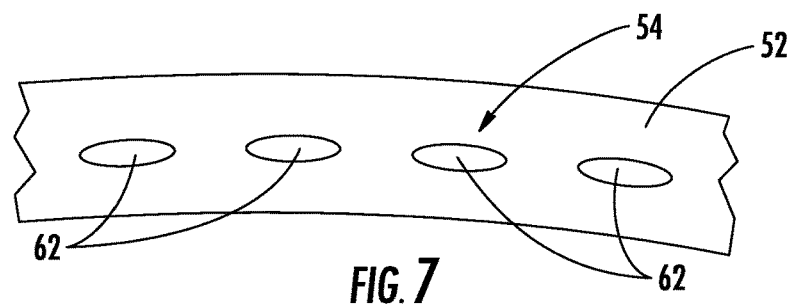
FIG. 7 is a downstream view of the outlets of the rotor centering cooling channel extending through the turbine casing exhaust flange.

In at least one embodiment, the gas turbine engine 10 may include a plurality of struts 14 extending from the exhaust diffuser 16 radially inward to the inner exhaust diffuser housing 40 forming the radially inner surface 42 of the exhaust diffuser 16. In at least one embodiment, the gas turbine engine 10 may include a total of six struts 14, as shown in FIG. 6. As such, three of the struts 14, such as a top strut 20, a first side strut 70 and second side strut 72, may be positioned above a midline plane 74 of the gas turbine engine 10 that extends generally through the central longitudinal axis 34 of the gas turbine engine 10. In at least one embodiment, the top strut 20 may extend generally from the inner exhaust diffuser housing 40 to top dead center 28 of the outer wall 58 forming the exhaust diffuser 16. In other embodiments, the top strut 20 may be positioned in other positions. The first side strut 70 may be offset circumferentially to a first side 78 of the top strut 20 and may be positioned between the top strut 20 and the midline plane 74. The second side strut 72 may be offset to a second side 80 that is in an opposite circumferential direction from the first side 78 and may be positioned between the top strut 20 and the midline plane 74.

In at least one embodiment, the top strut 20, first side strut 70 and second side strut 72 each have an internal cooling system 44 and the rotor centering cooling system 12 providing cooling. Each of the top strut 20, first side strut 70 and second side strut 72 may include an exhaust cooling manifold 48 in communication with the internal cooling system 44 positioned within the outer walls 46 forming the struts 20, 70, 72 for supplying cooling fluid to the internal cooling system 44 in the struts 20, 70, 72. The cooling manifolds 48 for the struts 20, 70, 72 may or may not be in contact with each other. The rotor centering cooling channels 60 in the struts 20, 70, 72 may extend from inlets 50 in the exhaust cooling manifold 48, through the turbine casing exhaust flange 52 to the outlets 54 in the shroud cavity 56 upstream from the struts 20, 70, 72 and radially outward from the outer wall 58 forming the exhaust diffuser 16. The cooling fluid flowing through the rotor centering cooling channel 60 may entrain ambient air within the shroud cavity 56, thereby purging the shroud cavity 56 and cooling the turbine casing exhaust flange 52.

The rotor centering cooling system 12 is configured such that cooling fluids from the exhaust cooling manifold 48 are passed through the turbine casing exhaust flange 52 at least twice. In particular, the cooling fluids flow through the turbine casing exhaust flange 52 first by flowing into the metering hole 66 and into the exhaust cooling manifold 48. The metering hole 66 is sized to increase cooling fluid flow into the exhaust cooling manifold 48. In addition, a portion of the cooling fluid flows into the internal cooling system 44 in the strut 14, and a portion of the cooling fluid in the exhaust cooling manifold 48 flows into the inlet 50 of the rotor centering cooling channel 60. The rotor centering cooling channel 60 routes the cooling fluid back through the turbine casing exhaust flange 52, thereby cooling the turbine casing exhaust flange 52 once again. The rotor centering cooling channel 60 may pass radially inward of the metering hole 66. The cooling fluid is then exhausted from the rotor centering cooling channel 60 through the outlet 54.

The foregoing is provided for purposes of illustrating, explaining, and describing embodiments of this invention. Modifications and adaptations to these embodiments will be apparent to those skilled in the art and may be made without departing from the scope or spirit of this invention.

What is claimed is:

1. A gas turbine engine comprising:
    at least one exhaust diffuser positioned downstream from a turbine assembly, extending circumferentially around a central longitudinal axis of the gas turbine engine and having an increasing cross-sectional area from an upstream edge to a downstream edge;
    at least one strut extending from the at least one exhaust diffuser radially inward to an inner exhaust diffuser housing forming a radially inner surface of the exhaust diffuser;
    wherein the at least one strut includes at least one internal cooling system positioned within an outer wall forming the at least one strut; and a rotor centering cooling system, comprising:
  an exhaust cooling manifold in communication with the at least one internal cooling system positioned within the outer wall forming the at least one strut for supplying cooling fluid to the at least one internal cooling system in the at least one strut;
  at least one rotor centering cooling channel extending from an inlet in the exhaust cooling manifold, through a turbine casing exhaust flange to an outlet in a shroud cavity upstream from the at least one strut and radially outward from an outer wall forming the at least one exhaust diffuser, wherein the cooling fluid flowing through the at least one rotor centering cooling channel entrains ambient air within the shroud cavity, thereby purging the shroud cavity and cooling the turbine casing exhaust flange; and
  at least one exhaust cooling plenum forming a circumferentially extending cooling channel radially outward from the outer wall forming the at least one exhaust diffuser and wherein the exhaust cooling plenum is in fluid communication with the exhaust cooling manifold via at least one metering hole,
  wherein the at least one metering hole is positioned within the turbine casing exhaust flange, thereby providing cooling to the turbine casing exhaust flange.

2. The gas turbine engine of claim 1, wherein the exhaust cooling manifold is positioned radially outward from the at least one strut.

3. The gas turbine engine of claim 1, wherein the at least one exhaust cooling plenum is positioned upstream from the exhaust cooling manifold.

4. The gas turbine engine of claim 1, wherein the at least one rotor centering cooling channel extends upstream from the exhaust cooling manifold to the shroud cavity.

5. The gas turbine engine of claim 1, wherein the at least one rotor centering cooling channel extends from the exhaust cooling manifold to the shroud cavity and between the exhaust cooling manifold and the at least one strut.

6. The gas turbine engine of claim 1, wherein the outlet of the at least one rotor centering cooling channel is formed from at least one slot.

7. The gas turbine engine of claim 1, wherein the outlet of the at least one rotor centering cooling channel has a circular cross-section.

8. The gas turbine engine of claim 1, wherein the at least one strut comprises a top strut with a first side strut offset circumferentially to a first side and a second side strut offset to a second side that is in an opposite circumferential direction from the first side and wherein the top strut, first side strut and second side strut each have the at least one internal cooling system and the rotor centering cooling system, comprising an exhaust cooling manifold in communication with the at least one internal cooling system positioned within the outer wall forming the at least one strut for supplying cooling fluid to the at least one internal cooling system in the at least one strut; and formed from at least one rotor centering cooling channel extending from the inlet in the exhaust cooling manifold, through a turbine casing exhaust flange to an outlet in a shroud cavity upstream from the at least one strut and radially outward from an outer wall forming the at least one exhaust diffuser, wherein the cooling fluid flowing through the at least one rotor centering cooling channel entrains ambient air within the shroud cavity, thereby purging the shroud cavity and cooling the turbine casing exhaust flange.

9. The gas turbine engine of claim 1, wherein the top strut, first side strut and second side strut all extend upwardly above a midline plane of the gas turbine engine that extends generally through the central longitudinal axis of the gas turbine engine.

\* \* \* \* \*